United States Patent
Matsuo et al.

(10) Patent No.: US 10,870,666 B2
(45) Date of Patent: Dec. 22, 2020

(54) ALUMINUM ALLOY-CONTAINING COMPOSITION, PRODUCTION METHOD THEREFOR, AND TRIALKYL ALUMINUM PRODUCTION METHOD

(71) Applicant: Tosoh Finechem Corporation, Yamaguchi (JP)

(72) Inventors: Hiroshi Matsuo, Shunan (JP); Yujin Takemoto, Shunan (JP); Kotaro Sakoda, Shunan (JP); Toshio Naka, Shunan (JP)

(73) Assignee: TOSOH FINECHEM CORPORATION, Yamaguchi (JP)

( * ) Notice: Subject to any disclaimer, the term of this patent is extended or adjusted under 35 U.S.C. 154(b) by 0 days.

(21) Appl. No.: 16/343,090

(22) PCT Filed: Oct. 4, 2017

(86) PCT No.: PCT/JP2017/036096
§ 371 (c)(1),
(2) Date: Apr. 18, 2019

(87) PCT Pub. No.: WO2018/074231
PCT Pub. Date: Apr. 26, 2018

(65) Prior Publication Data
US 2020/0048282 A1    Feb. 13, 2020

(30) Foreign Application Priority Data

Oct. 20, 2016 (JP) ................. 2016-205712
Feb. 22, 2017 (JP) ................. 2017-030968

(51) Int. Cl.
  *C07F 5/06*    (2006.01)
(52) U.S. Cl.
  CPC ................. *C07F 5/062* (2013.01)
(58) Field of Classification Search
  None
  See application file for complete search history.

(56) References Cited

U.S. PATENT DOCUMENTS

| 2,744,127 | A | 5/1956 | Ziegler et al. |
| 3,786,080 | A | 1/1974 | Ichiki et al. |
| 5,473,090 | A | 12/1995 | Smit et al. |
| 6,305,622 | B1 * | 10/2001 | Iwao ............ C07F 5/062 241/23 |

FOREIGN PATENT DOCUMENTS

| CN | 104774219 A | 7/2015 |
| DE | 67427 A | 6/1969 |
| EP | 0990658 A1 | 4/2000 |
| JP | S50037656 B | 12/1975 |
| JP | H07033780 A | 2/1995 |
| JP | H09136890 A | 5/1997 |
| JP | 3580618 B2 | 10/2004 |
| JP | 4309478 B2 | 8/2009 |
| WO | 9903862 A1 | 1/1999 |

OTHER PUBLICATIONS

International Search Report dated Dec. 19, 2017 in International Application No. PCT/JP2017/036096.
International Preliminary Report on Patentability dated Dec. 19, 2017 in International Application No. PCT/JP2017/036096.
Partial Supplementary European Search Report dated Mar. 3, 2020 in EP Application No. 17861694.2.
Office Action dated Sep. 15, 2020 in JP Application No. 2016205712 (with English Machine Translation).
Extended European Search Report dated Jun. 4, 2020 in EP Application No. 17861694.2.
Office Action dated Oct. 26, 2020 in IN Application No. 201947019005.

\* cited by examiner

*Primary Examiner* — Clinton A Brooks
*Assistant Examiner* — Kofi Adzamli
(74) *Attorney, Agent, or Firm* — Panitch Schwarze Belisario & Nadel LLP

(57) ABSTRACT

A method for producing a particulate aluminum alloy involves pulverizing an aluminum alloy in a hydrocarbon solvent in the presence of an organic aluminum compound. Methods for producing trialkylaluminum involve reacting an aluminum-magnesium alloy with an alkyl halide in the presence of a nitrogen-containing organic compound to obtain a trialkylaluminum-containing reaction product, and reacting an aluminum-magnesium alloy and an alkyl halide. A highly active, low viscosity composition containing the particulate aluminum alloy and a method for producing the particulate aluminum alloy-containing composition are also described.

11 Claims, No Drawings

ALUMINUM ALLOY-CONTAINING COMPOSITION, PRODUCTION METHOD THEREFOR, AND TRIALKYL ALUMINUM PRODUCTION METHOD

CROSS-REFERENCE TO RELATED APPLICATION

This application is a Section 371 of International Application No. PCT/JP2017/036096, filed Oct. 4, 2017, which was published in the Japanese language on Apr. 26, 2018 under International Publication No. WO 2018/074231 A1, which claims priority under 35 U.S.C. 119 (b) to Japanese Application No. 2016-205712, filed Oct. 20, 2016 and Japanese Application No. 2017-030968, filed Feb. 22, 2017, the disclosures of which are incorporated herein by reference in their entirety.

TECHNICAL FIELD

The present invention relates to a particulate aluminum alloy and to a composition that contains the particulate alloy. The present invention further relates to a method for producing the particulate alloy-containing composition and to a method for producing trialkylaluminum using the particulate alloy-containing composition.

The trialkylaluminums produced by the above production method are strong Lewis acids and are useful compounds used for catalysts for organic synthesis and cocatalysts for polyolefin synthesis as well as for starting materials for same. They are also used as starting materials for semiconductors for, e.g., light-emitting devices and solar cells.

BACKGROUND ART

Aluminum alloys are used for the synthesis of organoaluminum compounds. PTL 1 states that trialkylaluminum can be synthesized from an aluminum alloy having a prescribed composition (PTL 1). The aluminum alloy is used for trialkylaluminum synthesis in the form of a powder provided by pulverization (dry pulverization). PTL 1 does not describe the pulverization method and does not mention the particle diameter of the obtained alloy powder.

When a powder of an aluminum alloy, such as an aluminum-magnesium alloy, is used for the synthesis of an organoaluminum compound, e.g., a trialkylaluminum, fine particles are regarded as preferable from the standpoint of obtaining a high reactivity. However, the risk of a dust explosion increases as the particles become finer.

PTL 2 describes a method in which an aluminum alloy is subjected to dry pulverization using a ball mill or vibrating mill. After pulverization, classification is carried out on a screen to obtain a 75 µm to 250 µm alloy powder. Considering avoidance of the risk of a dust explosion, the particle diameter of the alloy particles provided by the dry pulverization are assumed to be in the same range also for PTL 1.

Moreover, with regard to the specific trialkylaluminum synthesis reactions disclosed in PTL 1, it is stated that trimethylaluminum is obtained in a yield of 60% to 75% from the aluminum-magnesium alloy and methyl bromide. However, with regard to alkyl chlorides, which exhibit a poorer reactivity than alkyl bromides, an example is provided—although no yield is given—in which triethylaluminum is synthesized from ethyl chloride; however, no example is described of the synthesis of trimethylaluminum from methyl chloride.

PTL 3 describes a method for producing trialkylaluminum that uses an amorphous and uniform alloy having a prescribed composition; this alloy requires a process in which, during the production of the aluminum-magnesium alloy, the molten alloy is cooled and solidified. However, as a general matter, long reaction times have been required and it has been quite difficult to obtain high yields of trimethylaluminum when methyl chloride has been reacted with an aluminum-magnesium alloy having an x-ray diffraction spectrum for a polytype crystal structure.

PTL 2 describes a method for producing trihydrocarbylaluminum that uses an aluminum-magnesium alloy that has been subjected to pulverization using an abrasive medium. It is stated that—by carrying out the reaction with stirring during the reaction using an abrasive medium or using a high-speed homogenizer at a prescribed rotation rate—better effects are obtained than for reaction with ordinary stirring. However, when an abrasive medium is not used during the reaction, it has been quite difficult to obtain trimethylaluminum in good yields by reaction with methyl chloride even for the use of the pulverizate of an aluminum-magnesium alloy that has been produced by quench solidification.

PTL 1: U.S. Pat. No. 2,744,127
PTL 2: Japanese Patent No. 4,309,478
PTL 3: Japanese Patent No. 3,580,618

The entire contents of PTL 1, PTL 2, and PTL 3 are specifically cited as references herein.

SUMMARY OF INVENTION

Technical Problem

<First Aspect of Present Invention>

It has been quite difficult to easily (safely) and efficiently obtain an aluminum alloy having only a small particle diameter using, in accordance with PTL 2, only the dry pulverization of an aluminum alloy using a pulverizing apparatus such as, for example, a ball mill. In addition, a post-pulverization classification is required even to obtain alloy fine particles at 75 µm to 250 µm.

A first object for the first aspect of the present invention is to provide a method that can safely and easily obtain a more finely particulate aluminum alloy without requiring a post-pulverization classification, and to provide a particulate aluminum alloy that is finer than the particles yielded by dry pulverization.

Dry pulverization and wet pulverization can be used as methods for pulverizing aluminum alloy. In order to achieve the aforementioned object, the present inventors pursued wet pulverization instead of the dry pulverization described in PTL 2. However, it was found that, as the particle diameter of this alloy is reduced, the aluminum alloy-containing slurry composition undergoes a substantial increase in viscosity and adherence to the apparatus and clogging of the pipework and so forth become more severe. A more specific problem for the present invention is to provide a method that can solve these issues with wet pulverization and that can produce a more finely particulate aluminum alloy, and to provide a more finely particulate aluminum alloy using this method.

A second object for the first aspect of the present invention is to provide a method for producing alkylaluminum that uses the finely particulate aluminum alloy obtained as described above. In conventional methods, the particulate aluminum alloy starting material has had a large particle diameter and the yield from the aluminum alloy (aluminum recovery) has not been high.

PTL 2 describes the production of alkylaluminum by the reaction of an alkyl halide, e.g., methyl chloride, using an aluminum alloy powder obtained by dry pulverization. A stirring process is carried out in this method, in which an abrasive medium is introduced into the reactor when the reaction is run. However, a large load is imposed on the reaction vessel, e.g., damage, breakage, and so forth, due to local physical abrasion by the abrasive medium of the inner wall surfaces of the reaction vessel, and there are also problems with regard to safety. In addition, when this reaction is run using only a stirring process lacking the introduction of an abrasive medium into the reactor, the target alkylaluminum cannot be acquired in high yields and problems still remain with regard to obtaining the target easily, safely, and with good efficiency.

The third object of the first aspect of the present invention is to provide a method for producing alkylaluminum using a particulate aluminum alloy and an alkyl halide such as methyl chloride, wherein the alkylaluminum can be produced in high yields without requiring pulverization in the reaction with the alkyl halide.

<Second Aspect of Present Invention>

As noted above, obtaining the target easily and efficiently has been problematic when the synthesis of trialkylaluminum has been pursued using an aluminum-magnesium alloy and an alkyl halide. This is because an aluminum-magnesium alloy having the usual polytype crystal structure is less active than an aluminum-magnesium alloy having an amorphous and uniform composition. In addition, it should also be noted that alkyl chlorides, which are inexpensive and easy to acquire, exhibit a lower reactivity than alkyl bromides.

Aluminum-magnesium alloys having an amorphous and uniform composition have been quite difficult to acquire as such on an industrial scale because they require the special step of cooling and solidifying an alloy melt, and there has been desire for a method for producing trialkylaluminum that can use a broad range of aluminum-magnesium alloys.

The execution during the reaction of a stirring process after the introduction of an abrasive medium into the reaction apparatus has imposed a large load on the reaction vessel, e.g., damage, breakage, and so forth, due to local physical abrasion by the abrasive medium of the inner wall surfaces of the reaction vessel, and there have also been problems with regard to safety. In addition, when this reaction has been run using only a stirring process without the introduction of an abrasive medium within the reactor, it has not been possible to acquire the target trialkylaluminum in high yields, and problems still exist with regard to obtaining the target easily, safely, and with good efficiency.

An object of the second aspect of the present invention is to provide a method for producing trialkylaluminum using an aluminum-magnesium alloy and an alkyl halide such as methyl chloride, wherein the trialkylaluminum can be conveniently produced in high yields without requiring pulverization in the reaction with the alkyl halide.

Solution to Problem

With regard to the first aspect of the present invention, as a result of intensive investigations the present inventors discovered that when an aluminum-containing metal is pulverized in a hydrocarbon solvent, the viscosity of the aluminum-containing metal slurry is lowered by having an organoaluminum compound also be present and a finer pulverization of the particulate metal may be carried out than heretofore, and, due to the reduced viscosity, pulverization may be carried out stably and without clogging the pipework and without adherence to the pulverization apparatus during pulverization. The present invention was achieved based on this discovery.

The present invention relates to a method for producing a composition containing a finely particulate aluminum alloy, by pulverizing an aluminum alloy in the presence of a hydrocarbon solvent and an organoaluminum compound, and also relates to the finely particulate aluminum alloy-containing composition yielded by this method.

The present invention further relates to a method for producing alkylaluminum that uses as a starting material the finely particulate aluminum alloy obtained as indicated above.

With regard to the second aspect of the present invention, as a result of various research the present inventors discovered that, in the method of producing trialkylaluminum using an aluminum-magnesium alloy and a hydrocarbon halide, trimethylaluminum is obtained easily, safely, and with good efficiency by having a nitrogen-containing organic compound be co-present in the reaction of the aluminum-magnesium alloy and hydrocarbon halide. The present invention was achieved based on this discovery.

Thus, the present invention relates to a method for obtaining trialkylaluminum by reacting an aluminum-magnesium alloy with a hydrocarbon halide in the presence of a nitrogen-containing organic compound.

The present invention is as follows.

[1] A composition comprising a particulate aluminum alloy having a median diameter equal to or less than 50 µm, a hydrocarbon solvent, and the organoaluminum compound represented by general formula (1) below.

[C1]

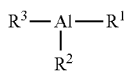

(1)

(In the formula, $R^1$, $R^2$, and $R^3$ each independently represent a hydrogen atom, a linear or branched alkyl group having 1 to 6 carbons, an aryl group, or a halogen atom.)

[2] The composition according to [1], wherein the organoaluminum compound represented by general formula (1) is at least one selected from the group consisting of trimethylaluminum, dimethylaluminum chloride, methylaluminum dichloride, triethylaluminum, diethylaluminum chloride, dimethylphenylaluminum, ethylaluminum sesquichloride, and ethylaluminum dichloride.

[3] The composition according to [1] or [2], wherein the content of the organoaluminum compound represented by general formula (1) is in the range equal to or more than 0.0001 mol to equal to or less than 0.5 mol per 1 mol of the aluminum in the aluminum alloy.

[4] The composition according to any one of [1] to [3], wherein the hydrocarbon solvent is at least one selected from the group consisting of saturated hydrocarbon solvents and aromatic hydrocarbon solvents.

[5] The composition according to any one of [1] to [4], wherein the hydrocarbon solvent is n-dodecane.

[6] The composition according to any one of [1] to [5], wherein the median diameter of the particulate aluminum alloy contained in the composition is equal to or less than 20 µm.

[7] A method for producing a particulate aluminum alloy-containing composition, comprising a step of obtaining the composition according to any one of [1] to [6] by pulverizing a slurry containing an aluminum alloy, a hydrocarbon solvent, and an organoaluminum compound represented by general formula (1).

[8] The production method according to [7], wherein the content of the organoaluminum compound represented by general formula (1) in the slurry is in the range equal to or more than 0.0001 mol to equal to or less than 0.5 mol per 1 mol of the aluminum in the aluminum alloy.

[9] The production method according to [7] or [8], wherein the pulverization is carried out using a bead mill or a homogenizer.

[10] A method for producing a particulate aluminum alloy, comprising pulverizing a slurry that contains an aluminum alloy, a hydrocarbon solvent, and an organoaluminum compound represented by the following general formula (1) to prepare a slurry containing a particulate aluminum alloy, and recovering the particulate aluminum alloy from the prepared slurry.

[C2]

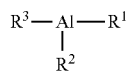

(1)

(In the formula, $R^1$, $R^2$, and $R^3$ each independently represent a hydrogen atom, a linear or branched alkyl group having 1 to 6 carbons, an aryl group, or a halogen atom.)

[11] The production method according to [10], wherein the median diameter of the particulate aluminum alloy is equal to or less than 50 μm.

[12] The production method according to [10] or [11], wherein the organoaluminum compound represented by general formula (1) is at least one selected from the group consisting of trimethylaluminum, dimethylaluminum chloride, methylaluminum dichloride, triethylaluminum, diethylaluminum chloride, dimethylphenylaluminum, ethylaluminum sesquichloride, and ethylaluminum dichloride.

[13] The production method according to any one of [10] to [12], wherein the hydrocarbon solvent is at least one selected from the group consisting of saturated hydrocarbon solvents and aromatic hydrocarbon solvents.

[14] The production method according to any one of [10] to [13], wherein the hydrocarbon solvent is n-dodecane.

[15] The production method according to any one of [10] to [14], wherein the pulverization is carried out using a bead mill or a homogenizer.

[16] The production method according to any one of [10] to [15], wherein the particulate aluminum alloy is recovered by removing the organoaluminum compound by washing with the hydrocarbon solvent of the slurry composition and then, after the washing, removing the hydrocarbon solvent from the slurry composition.

[17] The production method according to any one of [10] to [16], wherein the particulate aluminum alloy is an aluminum alloy of which viscosity of slurry provided by addition of 3 weight parts n-dodecane per 1 weight part of the aluminum alloy being equal to or less than 14 cP.

[18] A method for producing trialkylaluminum by the reaction of an aluminum alloy with an alkyl halide, wherein the production method uses, as the aluminum alloy, the particulate aluminum alloy of a composition according to [1] to [6] or the particulate aluminum alloy obtained by a production method according to [10] to [17].

[19] The production method according to [18], wherein the alkyl halide is methyl chloride.

[20] The production method according to [18] or [19], wherein the trialkylaluminum is trimethylaluminum.

[21] A method for producing trialkylaluminum, comprising a step (1) of obtaining a trialkylaluminum-containing reaction product by reacting an aluminum-magnesium alloy with an alkyl halide in the presence of a nitrogen-containing organic compound.

[22] The production method according to [21], wherein the reaction product from the step (1) contains a dialkylaluminum halide and the production method further contains a step (2) of converting the dialkylaluminum halide to a trialkylaluminum by feeding this reaction product to a reductive dechlorination reaction.

[23] The production method according to [21] or [22], wherein at least one additive selected from the group consisting of alkylaluminum compounds, iodine, bromine, and halogen compounds is also present in the step (1).

[24] The production method according to [23], wherein the amount of additive addition is in the range equal to or more than 0.01 mol to equal to or less than 0.3 mol per 1 mol of the aluminum in the aluminum-magnesium alloy.

[25] The production method according to any one of [21] to [24], wherein the nitrogen-containing organic compound is one or two or more compounds selected from the group consisting of amine compounds, nitrogen atom-containing heterocyclic compounds, and amide compounds.

[26] The production method according to [25], wherein the amine compound is a secondary amine compound or a tertiary amine compound.

[27] The production method according to [25], wherein the nitrogen atom-containing heterocyclic compound is an unsaturated heterocyclic compound.

[28] The production method according to any one of [21] to [27], wherein the amount of the nitrogen-containing organic compound is in the range equal to or more than 0.001 mol to equal to or less than 0.2 mol per 1 mol of the aluminum in the aluminum-magnesium alloy.

[29] The production method according to any one of [23] to [28], wherein the alkylaluminum compound is a dialkylaluminum halide.

[30] The production method according to any one of [21] to [29], wherein the alkyl halide is a methyl halide.

[31] The production method according to any one of [21] to [29], wherein the alkyl halide is methyl chloride and the trialkylaluminum is trimethylaluminum.

Advantageous Effects of Invention

A highly active aluminum alloy useful as a starting material for organoaluminum compounds, and a composition that contains this metal, can be obtained in accordance with the first aspect of the present invention.

In addition, in accordance with the present invention, alkylaluminum can be produced in high yields without requiring pulverization in the reaction with the alkyl halide.

Common, generally readily acquirable aluminum-magnesium alloys can be used in accordance with the second aspect of the present invention, and the second aspect of the present invention also makes possible the convenient production of trialkylaluminum without having to use a special production procedure such as the use of an abrasive medium during the reaction.

DESCRIPTION OF EMBODIMENTS

First Embodiment

An embodiment (the first embodiment) for executing the first aspect of the invention is described in the following.
<<Method for Producing Particulate Aluminum Alloy Composition>>

The production method according to the present embodiment contains a step of pulverizing a slurry that contains an aluminum alloy, a hydrocarbon solvent, and an organoaluminum compound represented by general formula (1).

[C3]

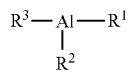

(1)

(In the formula, $R^1$, $R^2$, and $R^3$ each independently represent a hydrogen atom, a linear or branched alkyl group having 1 to 6 carbons, an aryl group, or a halogen atom.)

The production method according to the present embodiment uses an aluminum alloy, a hydrocarbon solvent, and an organoaluminum compound as starting materials.

A commercial product or a product produced by a known method can be used for the aluminum alloy, and it should have a particle diameter that will not result in clogging within the pulverization apparatus during pulverization. In specific terms, the average particle diameter of the aluminum alloy prior to pulverization should be equal to or less than the particle diameter at which problems, e.g., blockage of the screen in the pulverization apparatus during pulverization and so forth, do not occur, and, for example, is desirably equal to or less than 500 μm as the median diameter.

In this Description, the median diameter denotes the 50% particle diameter that is the particle diameter at the point where the cumulative % distribution curve for the particle size distribution data intersects with the 50% (volume basis) horizontal axis.

The aluminum alloy can be an alloy that contains, for example, 20 to 99 wt % aluminum wherein the aluminum content is more preferably 30 to 70 wt % and is still more preferably 35 to 50 wt %. The metal in the aluminum alloy other than aluminum should be a metal that forms an alloy with aluminum, wherein an alkali metal, e.g., lithium, sodium, and potassium; alkaline-earth metal, e.g., beryllium, magnesium, and calcium; a group 11 metal of the periodic table, e.g., copper, silver, and gold; or a group 12 metal, e.g., zinc, cadmium, and mercury, is preferred and magnesium is more preferred. Thus, the aluminum alloy is preferably an aluminum-magnesium alloy.

There are no particular limitations on the hydrocarbon solvent, but the hydrocarbon solvent is preferably a hydrocarbon solvent that is hydrophobic and poorly reactive. Such an organic solvent can be exemplified by at least one selected from the group consisting of saturated hydrocarbon solvents and aromatic hydrocarbon solvents.

The hydrocarbon solvent preferably has a boiling point in the range from 30° C. to 200° C. The aforementioned saturated hydrocarbon solvent may be a substituted or unsubstituted linear saturated hydrocarbon having 3 to 20 carbons or may be a substituted or unsubstituted cyclic saturated hydrocarbon. Paraffin oils and their mixtures may be included.

The saturated hydrocarbon solvent can be specifically exemplified by n-propane, n-butane, n-pentane, n-hexane, n-heptane, n-octane, n-nonane, n-decane, n-undecane, n-dodecane, n-tridecane, n-tetradecane, cyclopentane, cyclohexane, cyclopentane, cyclooctane, cyclodecane, o-menthane, m-menthane, p-menthane, decahydronaphthalene, $C_nH_{2n+2}$ paraffins, and $C_nH_{2n+2}$ isoparaffins. n-dodecane is particularly preferred. These examples are denoted as hydrocarbon solvent He in this Description.

The aromatic hydrocarbon used as the solvent is preferably an unsubstituted aromatic hydrocarbon or an aromatic hydrocarbon having a substituent selected from the group consisting of alkyl groups having 1 to 8 carbons, cycloalkyl groups having 3 to 8 carbons, and alkylene groups having 2 to 8 carbons.

The alkyl groups having 1 to 8 carbons that may be a substituent on the aromatic hydrocarbon can be exemplified by methyl, ethyl, n-propyl, isopropyl, n-butyl, sec-butyl, tert-butyl, n-pentyl, isopentyl, neopentyl, tert-pentyl, n-hexyl, isohexyl, neohexyl, tert-hexyl, n-heptyl, isoheptyl, neoheptyl, tert-heptyl, n-octyl, isooctyl, neooctyl, and tert-octyl.

The cycloalkyl groups having 3 to 8 carbons that may be a substituent on the aromatic hydrocarbon can be exemplified by cyclopropyl, cyclobutyl, cyclopentyl, cyclohexyl, cycloheptyl, and cyclooctyl.

The alkylene groups having 2 to 8 carbons that may be a substituent on the aromatic hydrocarbon can be exemplified by ethylene, propylene, and butylene.

The aromatic hydrocarbon can be specifically exemplified by cumene, o-cumene, m-cumene, p-cumene, propylbenzene, n-butylbenzene, sec-butylbenzene, tert-butylbenzene, 1-phenylpentane, 1-phenylheptane, 1-phenyloctane, 1,2-diethylbenzene, 1,4-diethylbenzene, mesitylene, 1,3-di-tert-butylbenzene, 1,4-di-tert-butylbenzene, di-n-pentylbenzene, tri-tert-butylbenzene, cyclohexylbenzene, indane, and tetralin.

A compound represented by general formula (1) is used as the organoaluminum compound, but this should not be construed as a limitation to the exemplary compounds.

The $R^1$, $R^2$, and $R^3$ in the formula for the compound represented by general formula (1) each independently represent a hydrogen atom, a linear or branched alkyl group having 1 to 6 carbons, an aryl group, or a halogen atom. Preferably any one of $R^1$, $R^2$, and $R^3$ is an alkyl group or aryl group, and more preferably two or more are an alkyl group or aryl group.

The linear or branched alkyl group having 1 to 6 carbons can be exemplified by the methyl group, ethyl group, n-propyl group, isopropyl group, n-butyl group, isobutyl group, sec-butyl group, t-butyl group, n-amyl group, t-amyl group, n-hexyl group, and cyclohexyl group.

The linear or branched alkyl group having 1 to 6 carbons is preferably the methyl group, ethyl group, n-propyl group, isopropyl group, n-butyl group, isobutyl group, sec-butyl group, or t-butyl group, and is more preferably the methyl group or ethyl group.

The aryl group is preferably an aryl group having 6 to 20 carbons and is more preferably an aryl group having 6 to 10 carbons. The aryl group may be substituted by a substituent such as an alkyl group, halogen atom, cyano group, nitro group, acyl group, alkoxy group, or acyloxy group.

The organoaluminum compound can be specifically exemplified by the following: trimethylaluminum, dimethylaluminum chloride, methylaluminum sesquichloride, methylaluminum dichloride, triethylaluminum, diethylaluminum chloride, dimethylphenylaluminum, ethylaluminum sesquichloride, and ethylaluminum dichloride.

The organoaluminum compound is preferably trimethylaluminum, dimethylaluminum chloride, methylaluminum dichloride, triethylaluminum, diethylaluminum chloride, dimethylphenylaluminum, ethylaluminum sesquichloride, or ethylaluminum dichloride; more preferably trimethylaluminum, dimethylaluminum chloride, methylaluminum dichloride, triethylaluminum, diethylaluminum chloride, dimethylphenylaluminum, ethylaluminum sesquichloride, or ethylaluminum dichloride; and still more preferably trimethylaluminum, dimethylaluminum chloride, or triethylaluminum. A single one of these organoaluminum compounds may be used by itself or a combination of two or more may be used.

The hydrocarbon solvent and the organoaluminum compound may be used in the form of commercial products or products produced by a known method.

The amount of use of the organoaluminum compound in the aforementioned starting material composition of the present embodiment—viewed from the standpoint of the desired effect, i.e., the composition is unproblematic with regard to sticking to the apparatus during pulverization, clogging of the pipework, and so forth—is suitably in the range from 0.0001 mol to 0.5 mol per 1 mol of aluminum in the aluminum alloy. Viewed from the standpoint of obtaining a better pulverization outcome, the range from 0.005 mol to 0.3 mol is preferred and the range from 0.01 mol to 0.1 mol is more preferred.

The amount of use of the hydrocarbon solvent is not particularly limited, but, for example, can be in the range from 0.1 mol to 100 mol per 1 mol of the aluminum alloy and is preferably in the range from 2 mol to 10 mol per 1 mol of the aluminum alloy.

Pulverization is carried out by the application of external force to bring about exposure to forces such as, for example, compression, impact, shear, friction, cutting, and so forth, of sufficient magnitude to overcome the bonding forces within the powder, and a pulverization apparatus can be used that converts the energy of the power source to such forces and applies same to the powder. The pulverization apparatus is preferably a vibrating mill, jet mill, bead mill, or homogenizer and is more preferably a bead mill or homogenizer.

When the pulverization apparatus is a bead mill, metal beads, e.g., of iron or stainless steel, or ceramic beads, e.g., of alumina or zirconia, are preferred. The fill ratio can be at least 50% of the internal volume of the mill, while at least 70% is preferred.

The temperature during pulverization in the present embodiment of the composition provided by mixing the aluminum alloy and organoaluminum compound in the hydrocarbon solvent should be equal to or less than the operating temperature of the pulverization apparatus, but is not otherwise particularly limited and can be, for example, in the range from −50° C. to 200° C. and is preferably in the range from −10° C. to 50° C.

A composition containing a particulate aluminum alloy can be obtained using the present embodiment. The median diameter of the particulate aluminum alloy is preferably not greater than 50 μm, more preferably not greater than 20 μm, and still more preferably not greater than 13 μm. There is no particular lower limit on the median diameter, but for practical production conditions it is at least 1 μm and preferably at least 5 μm. However, this should not be construed as a limitation thereto.

The addition of an organoaluminum compound to the aluminum alloy and hydrocarbon solvent in accordance with the above-described method of the present embodiment makes it possible to maintain a low viscosity for the composition (slurry) even as pulverization advances and as a result can prevent sticking within the production apparatus during pulverization and can prevent clogging of, e.g., the pipework and so forth, during pulverization. In addition, the particulate aluminum alloy can be produced in the form of material having a smaller particle diameter. A particulate aluminum alloy having a smaller particle diameter exhibits higher activity when used for the production of trialkylaluminum.

<<Method for Producing Particulate Aluminum Alloy>>

The present embodiment also encompasses a method for producing a particulate aluminum alloy. This method includes a step of pulverizing a slurry that contains an aluminum alloy, a hydrocarbon solvent, and an organoaluminum compound represented by general formula (1) to prepare a slurry containing a particulate aluminum alloy, and recovering the particulate aluminum alloy from the prepared slurry. The slurry preparation step is the same as the previously described method for producing a particulate aluminum alloy-containing composition.

Recovery of the particulate aluminum alloy from the particulate aluminum alloy-containing slurry composition can be carried out, for example, by washing the slurry composition with hydrocarbon solvent (removal of the organoaluminum composition) and removal of the hydrocarbon solvent from the slurry composition after washing. More specifically, a hydrocarbon solvent is added to the slurry composition and the supernatant is taken off after standing at quiescence. The organoaluminum compound present in the slurry can be removed by repeating this process a plurality of times. The particulate aluminum alloy can then be recovered by removing the hydrocarbon solvent by drying the slurry.

The median diameter of the thusly obtained particulate aluminum alloy is preferably not greater than 50 μm, more preferably not greater than 20 μm, and still more preferably not greater than 13 μm. There is no particular lower limit on the median diameter, but for practical production conditions it is at least 1 μm and preferably at least 5 μm. However, this should not be construed as a limitation thereto.

In addition, the thusly obtained particulate aluminum alloy characteristically exhibits a low viscosity for its mixture (slurry) with organic solvent. The viscosity (23° C.) of the particulate aluminum alloy-containing composition provided by the addition of 3 weight parts of n-dodecane to 1 weight part of the aluminum alloy is, for example, equal to or less than 15 cP and is preferably equal to or less than 14 cP. While there are no particular limitations on the lower limit value, it is equal to or more than 2 cP from a practical standpoint. The viscosity can be measured using a rotary viscometer. A particulate aluminum alloy that exhibits a low viscosity when made into a slurry with an organic solvent in this manner is useful in terms of enabling the execution of the reaction at relatively low viscosities when trialkylaluminum production is carried out in an organic solvent.

The particulate aluminum alloy according to the present embodiment and the composition according to the present embodiment that contains the particulate alloy can be used for the synthesis of various organoaluminum compounds using common methods.

<<Method for Producing Trialkylaluminum>>

The present embodiment encompasses a method for producing trialkylaluminum by reacting an aluminum alloy with an alkyl halide. This method uses, as the aluminum alloy, the particulate aluminum alloy of the previously described composition according to the present embodiment, or the particulate aluminum alloy obtained by the production method according to the present embodiment.

The alkyl halide can be exemplified by methyl chloride, methyl bromide, methyl iodide, ethyl chloride, ethyl bromide, ethyl iodide, n-propyl chloride, n-propyl bromide, n-propyl iodide, isopropyl chloride, isopropyl bromide, isopropyl iodide, n-butyl chloride, n-butyl bromide, n-butyl iodide, isobutyl chloride, isobutyl bromide, and isobutyl iodide. Preferred among the preceding are methyl chloride, methyl bromide, and methyl iodide, while methyl chloride is more preferred. These examples are referred to as alkyl halide Ha in this Description.

The trialkylaluminum can be exemplified by trimethylaluminum, triethylaluminum, tri-n-propylaluminum, triisopropylaluminum, tri-n-butylaluminum, and triisobutylaluminum. Among the preceding, triethylaluminum and trimethylaluminum are preferred and trimethylaluminum is more preferred. These examples are referred to as trialkylaluminum Ta in this Description.

The reaction between the aluminum alloy and alkyl halide can be carried out using ordinary methods. For example, it can be carried out by the continuous or intermittent addition of the alkyl halide to the aluminum alloy. In addition, a small amount of, e.g., an organoaluminum compound or iodine, aluminum bromide, and so forth, may be used as a reaction initiator.

A diluent solvent may also be used in the reaction, for example, the aforementioned hydrocarbon solvent or aromatic hydrocarbon solvent. Since the reaction is an exothermic reaction, the charge amounts are adjusted so as to avoid an excessive rise in the internal temperature.

A vertical or horizontal reactor may be used as the reaction apparatus; for example, a pressure-resistant, stirrer-equipped autoclave may be used. The stirring impeller used may be any commonly known stirring impeller and can be exemplified by a propeller, turbine, a Pfaudler impeller, a Maxblend impeller, a Fullzone impeller, and so forth.

After completion of the reaction, the crude organoaluminum compound is recovered from the solid or semisolid mixture by distillation or solvent extraction. Because halogen remains in this crude trialkylaluminum compound, preferably the halogen is removed by further treatment with aluminum alloy at 130° C. to 160° C.

The target trialkylaluminum can be produced by distillation or filtration of the slurry from which the halogen has been removed.

Second Embodiment

An embodiment (the second embodiment) for executing the second aspect of the present invention is described in the following.

The production method according to the present embodiment is a method for producing trialkylaluminum that contains a step (1) of obtaining a trialkylaluminum-containing reaction product by reacting an aluminum-magnesium alloy with an alkyl halide in the presence of a nitrogen-containing organic compound.

The production method according to the present embodiment may additionally contain a step (2) wherein the reaction product from the step (1) contains a dialkylaluminum halide and this reaction product is supplied to a reductive dechlorination reaction to convert the dialkylaluminum halide to trialkylaluminum.

Step (1)

The reaction formula for obtaining trialkylaluminum from aluminum-magnesium alloy and alkyl halide in step (1) is represented by the following formula (2) for the case, for example, of $Al_2Mg_3$.

[C4]

$$Al_2Mg_3 + 6RX \rightarrow 2AlR_3 + 3MgX \quad (2)$$

In formula 1, R represents a chain or cyclic alkyl group having 1 to 20 carbons and can be specifically exemplified by the methyl group, ethyl group, n-propyl group, isopropyl group, n-hexyl group, and n-octyl group. X is chlorine, bromine, or iodine.

The alloy used in the reaction in the step (1) can be, for example, an alloy that contains 20 to 99 wt % aluminum wherein the aluminum content is more preferably 30 to 70 wt % and is still more preferably 35 to 50 wt %. The metal in the aluminum alloy other than aluminum should be a metal that forms an alloy with aluminum, wherein an alkali metal, e.g., lithium, sodium, and potassium; alkaline-earth metal, e.g., beryllium, magnesium, and calcium; a group 11 metal of the periodic table, e.g., copper, silver, and gold; or a group 12 metal, e.g., zinc, cadmium, and mercury, is preferred and magnesium is more preferred. Thus, the aluminum alloy is preferably an aluminum-magnesium alloy.

The aluminum-magnesium alloy is not particularly limited, but can be used for the reaction after a pulverization treatment. A heretofore known method for executing a pulverization treatment on alloys in general with, e.g., a ball mill, bead mill, jet mill, and so forth, can be used for the pulverization treatment. The particle diameter of the aluminum-magnesium alloy is not particularly limited, but the median diameter (volume basis), for example, is preferably 1 μm to 150 μm, more preferably 1 μm to 80 μm, and still more preferably 5 μm to 20 μm.

Generally acquirable alkyl halides can be used as the alkyl halide. The alkyl halide is represented by the general formula RX where R represents a chain or cyclic alkyl group having 1 to 20 carbons and can be specifically exemplified by the methyl group, ethyl group, n-propyl group, isopropyl group, n-hexyl group, and n-octyl group. X is chlorine, bromine, or iodine. Other examples are the alkyl halide Ha examples provided as examples in the first embodiment.

The amount of use of the alkyl halide, with reference to 1 mol of the aluminum in the aluminum-magnesium alloy, should be equal to more than 2 mol and is preferably from equal to more than 2 mol to equal to less than 4 mol and is more preferably from equal to more than 2.5 mol to equal to less than 3.5 mol.

The reaction may use a batch procedure, semi-batch procedure, or continuous procedure and may be run without particular limitation. A vertical or horizontal pressure-resistant reaction vessel may be used as the reaction apparatus. For example, a pressure-resistant, stirrer-equipped autoclave may be used. The stirring impeller used may be any commonly known stirring impeller and can be exemplified by a propeller, turbine, a Pfaudler impeller, a Maxblend impeller, a Fullzone impeller, and so forth. A homogenizer may also be used.

The alkyl halide may be introduced into the reactor continuously or may be introduced intermittently. Since the reaction is an exothermic reaction, the amount of introduction and the heating temperature must be controlled when the alkyl halide is introduced continuously in order to prevent an excessive rise in temperature. In the case of intermittent introduction, preferably heating is performed after the alkyl halide has been introduced and the reaction is run until the exothermic reaction is finished. The aforementioned reaction may also be repeated in the case of intermittent introduction. The present embodiment is preferably carried out by introducing the alkyl halide into a slurry prepared by suspending the aluminum-magnesium alloy in a solvent.

The reaction temperature is not particularly limited, but is preferably 20° C. to 170° C. and is more preferably 40° C. to 120° C. The reaction time is not particularly limited, but is preferably 1 to 12 hours and is more preferably 3 to 8 hours.

A solvent can be used in the reaction, and, for example, a hydrocarbon solvent can be used as this solvent. The hydrocarbon solvent is preferably a hydrocarbon solvent that is hydrophobic and poorly reactive. Such an organic solvent can be exemplified by at least one selected from the group consisting of saturated hydrocarbon solvents and aromatic hydrocarbon solvents. Preferred examples of the hydrocarbon solvent are the hydrocarbon solvent He examples provided as examples in the previously described first embodiment.

The amount of use of the solvent is not particularly limited, but, for example, can be in the range equal to more than 0.1 mol to equal to less than 100 mol and preferably in the range equal to more than 2 mol to equal to less than 10 mol with reference to the aluminum in 1 mol of the aluminum-magnesium alloy.

The reaction in step (1) is carried out in the presence of a nitrogen-containing organic compound, and the nitrogen-containing organic compound is a compound that has at least one nitrogen atom. The nitrogen-containing organic compound can be exemplified by amine compounds, nitrogen atom-containing heterocyclic compounds, and amide compounds. Two or more of these nitrogen-containing organic compounds may be used in combination.

The nitrogen-containing organic compound preferably has 1 to 24 carbons, more preferably 1 to 12 carbons, and still more preferably 1 to 8 carbons. The number of nitrogen atoms is preferably 1 to 12, more preferably 1 to 6, and still more preferably 1 to 3. The nitrogen-containing organic compound can be exemplified by amine compounds (aliphatic amine compounds, aromatic amine compounds), nitrogen atom-containing heterocyclic compounds, and amide compounds.

The aliphatic amine compound can be exemplified by primary amines such as methylamine, ethylamine, butylamine, amylamine, isoamylamine, cyclohexylamine, hexamethylenediamine, spermidine, spermine, and amantadine; secondary amines such as dimethylamine, diethylamine, diisopropylamine, dibutylamine, diisobutylamine, diamylamine, and dicyclohexylamine; and tertiary amines such as trimethylamine, triethylamine, tributylamine, triisobutylamine, triethanolamine, tricyclohexylamine, and N,N-diisopropylethylamine. The use in the present embodiment of tertiary amines is particularly preferred.

The aromatic amine compound can be exemplified by aniline, N,N-dimethylaniline, phenethylamine, toluidine, catecholamines, and 1,8-bis(dimethylamino)naphthalene.

The nitrogen atom-containing heterocyclic compound is preferably an unsaturated heterocyclic compound and is more preferably an aromatic heterocyclic compound. Specific examples are saturated heterocyclic compounds such as pyrrolidine, piperidine, piperazine, morpholine, quinuclidine, 1,4-diazabicyclo[2.2.2.]octane, and pyrrole, and unsaturated heterocyclic compounds such as pyrazole, imidazole, pyridine, pyridazine, pyrimidine, pyrazine, oxazole, thiazole, 4-dimethylaminopyridine, indole, quinoline, isoquinoline, purine, imidazole, triazole, carbazole, 1-methylimidazole, 1-ethylimidazole, and 1-butylimidazole. The use in the present embodiment of unsaturated heterocyclic compounds (particularly aromatic unsaturated compounds) is preferred.

The amide compound can be exemplified by chain amide compounds such as formamide, acetamide, N,N-dimethylacetamide, and 1,1'-azobis(N,N-dimethylformamide) and by cyclic amide compounds such as N-methylpyrrolidone, benzamide, and acetanilide.

The nitrogen-containing organic compound should be present in the reaction in the step (1) at equal to or less than 1 mol per 1 mol of the aluminum in the aluminum-magnesium alloy, wherein the range equal to or more than 0.001 mol to equal to or less than 0.2 mol is preferred, the range equal to or more than 0.001 mol to equal to or less than 0.1 mol is more preferred, and the range equal to or more than 0.01 mol to equal to or less than 0.08 mol is still more preferred.

The effect of the nitrogen-containing organic compound in the reaction between the aluminum-magnesium alloy and alkyl halide in the step (1) of the present embodiment is hypothesized to be as follows: because the nitrogen-containing organic compound engages in chemical bonding with the magnesium chloride or aluminum/magnesium/chlorine complex that is by-produced by the reaction, a reaction system can be established that is resistant to deposition or coating on the surface of the reactive aluminum-magnesium alloy. However, the entire mechanism has not been elucidated and the present embodiment is not bound to this hypothesis.

In addition to the nitrogen-containing organic compound, at least one additive selected from the group consisting of alkylaluminum compounds, iodine, bromine, and halogen compounds may also be present in the step (1).

The alkylaluminum compound can be exemplified by trialkylaluminum, alkylaluminum sesquichloride, dialkylaluminum chloride, and alkylaluminum dichloride. The addition of the alkylaluminum compound improves the selectivity for trialkylaluminum and the conversion to trialkylaluminum in the step (1). The reason for this is hypothesized to be an inhibition of a strong, sharp reaction between the aluminum-magnesium alloy and the alkyl halide. However, the reason here is not bound to this hypothesis. The mixture of dialkylaluminum chloride and trialkylaluminum that is the reaction product in the step (1) can also be used as such as the alkylaluminum compound used for the additive.

The amount of addition of the alkylaluminum compound, per 1 mol of the aluminum in the aluminum-magnesium alloy, is preferably in the range equal to more than 0.001 mol to equal to less than 0.1 mol and is more preferably in the range equal to more than 0.01 mol to equal to less than 0.05 mol.

The halogen compound additive can be exemplified by methyl iodide, ethyl iodide, ethyl bromide, and methyl bromide. The addition of the iodine, bromine, and/or halogen compound results in an improved conversion of the aluminum-magnesium alloy in the step (1) and in an improved selectivity for trialkylaluminum and conversion to trialkylaluminum. The reason for this is hypothesized to be as follows: the iodine, bromine, and halogen compound each function to remove, e.g., the oxide film on the aluminum-magnesium alloy, the by-produced magnesium chloride, and so forth, which results in exposure of the active surface of the alloy and the efficient development of the reaction. However, the reason here is not bound to this hypothesis.

The amount of addition of the iodine, bromine, or halogen compound additive, per 1 mol of the aluminum in the aluminum-magnesium alloy, is preferably in the range equal to more than 0.01 mol to equal to less than 0.3 mol and is more preferably in the range equal to more than 0.05 mol to equal to less than 0.15 mol.

The use for the additive of an alkylaluminum compound in combination with iodine, bromine, or a halogen compound is preferred because this improves the conversion of the aluminum-magnesium alloy and improves the selectivity for trialkylaluminum and conversion to trialkylaluminum. In particular, the combination of iodine with a dialkylaluminum halide as the alkylaluminum compound is preferred. When the starting alkyl halide is methyl chloride and the trialkylaluminum product is trimethylaluminum, preferably the dialkylaluminum halide is dimethylaluminum chloride and the additive is a combination of iodine and dimethylaluminum chloride.

Step (2)

The reaction product from the step (1) contains dialkylaluminum halide in addition to trialkylaluminum. In the step (2), the reaction product containing trialkylaluminum and dialkylaluminum halide is provided to a reductive dechlorination reaction and the dialkylaluminum halide is converted to trialkylaluminum. The alkyl group in the trialkylaluminum is not particularly limited, but may be cyclic or chain (linear or branched) and preferably has 1 to 20 carbons, more preferably 1 to 16 carbons, even more preferably 1 to 12 carbons, still more preferably 1 to 6 carbons, and particularly preferably 1 to 3 carbons. The methyl group and ethyl group are preferred among the preceding, with the methyl group being more preferred. Specific examples are the trialkylaluminum Ta examples provided as examples in the previously described first embodiment.

Specifically, after the completion of the reaction, for example, the trialkylaluminum and by-produced dialkylaluminum chloride can be obtained by distillation. The dialkylaluminum chloride obtained as by-product is further submitted to a reductive dechlorination reaction and a reductive elimination of the chlorine fraction is carried out in combination with the generation of trialkylaluminum. The reductive dechlorination reaction can be carried out using a reductive dechlorination agent. Specifically, the mixture of trialkylaluminum and dialkylaluminum chloride is provided to a reaction with the reductive dechlorination agent and the dialkylaluminum chloride is thereby converted to trialkylaluminum. The reaction with the reductive dechlorination agent can be run, for example, by heating to 100° C. to 150° C. Based on considerations of improving the trialkylaluminum yield and the ease of trialkylaluminum purification, the reaction is preferably run until almost the entire amount of the dialkylaluminum chloride has been converted to trialkylaluminum. The reductive dechlorination agent can be exemplified by aluminum-magnesium alloys, magnesium metal, sodium metal, and so forth. The aluminum-magnesium alloy used here can be the same as the alloy used in the step (1). The trialkylaluminum can also be obtained, for example, by distillation after the completion of the reductive dechlorination reaction. In the examples, trimethylaluminum having a purity of at least 99.99% is obtained by distillation after the completion of the reductive dechlorination reaction.

EXAMPLES

The present invention is described in additional detail in the following using examples; however, the present invention is not limited to or by these examples. The following analytic methods were used in the examples.

The median diameter (volume basis) given in Table 1-1 and Table 1-2 was measured using a Mastersizer 2000 laser diffraction particle size distribution analyzer from Malvern.

A MultiLab from Shinmaru Enterprises Corporation was used for the bead mill, and adhesion within the mill was visually inspected after pulverization.

The viscosity was measured using a Model TVB-10 viscometer from Toki Sangyo Co., Ltd.; the measurement was carried out using an M1 rotor at 100 rpm and room temperature (23° C.). The details of the viscosity measurement were in accordance with JIS Z 8803:2011.

Example 1: Example Corresponding to First Aspect of Invention

Example 1-1

2-mm zirconia beads were filled to a fill ratio of 70% into a 1.4-L bead mill. 375 g (5.98 mol as aluminum, 8.80 mol as magnesium) of an aluminum-magnesium alloy (43 wt % aluminum, 57 wt % magnesium) having a median diameter of 110 μm, 1500 g n-dodecane, and dimethylaluminum chloride (0.0808 mol: corresponds to 0.0135 mol for aluminum) were then introduced into a 5-L SUS vessel. While stirring the SUS vessel, this slurry was transferred to the bead mill and pulverization was performed in the mill. The slurry that had passed through the mill was recirculated by return to the SUS vessel. This pulverization process was carried out for 4 hours at a temperature in the mill not exceeding 50° C. After the completion of pulverization, the bead mill was disassembled and adhesion by the alloy within the mill was determined to be absent. After pulverization, 1660 g of an n-dodecane slurry of the aluminum-magnesium alloy was obtained from the 5-L SUS vessel. Approximately 0.2 g of the obtained n-dodecane slurry of the aluminum-magnesium alloy was sampled out and the median diameter was measured at 12.6 μm (Table 1-1).

Example 1-2

2-mm zirconia beads were filled to a fill ratio of 70% into a 1.4-L bead mill. 375 g (5.98 mol as aluminum, 8.80 mol as magnesium) of an aluminum-magnesium alloy (43 wt % aluminum, 57 wt % magnesium) having a median diameter of 110 μm, 1243 g n-dodecane, and dimethylaluminum chloride (0.0808 mol: corresponds to 0.0135 mol for aluminum) were then introduced into a 5-L SUS vessel. While stirring the SUS vessel, this slurry was transferred to the bead mill and pulverization was performed in the mill. The slurry that had passed through the mill was recirculated by return to the SUS vessel. This pulverization process was carried out for 4 hours at a temperature in the mill not exceeding 50° C. After the completion of pulverization, the bead mill was disassembled and adhesion by the alloy within the mill was determined to be absent. After pulverization, 1680 g of an n-dodecane slurry of the aluminum-magnesium alloy was obtained from the 5-L SUS vessel. Approximately 0.2 g of the obtained n-dodecane slurry of the aluminum-magnesium alloy was sampled out and the median diameter was measured at 9.7 μm (Table 1-1).

Example 1-3

2-mm zirconia beads were filled to a fill ratio of 70% into a 1.4-L bead mill. 375 g (5.98 mol as aluminum, 8.80 mol as magnesium) of an aluminum-magnesium alloy (43 wt % aluminum, 57 wt % magnesium), 875 g n-dodecane, and dimethylaluminum chloride (0.0808 mol: corresponds to 0.0135 mol for aluminum) were then introduced into a 5-L SUS vessel. While stirring the SUS vessel, this slurry was transferred to the bead mill and pulverization was performed in the mill. The slurry that had passed through the mill was recirculated by return to the SUS vessel. This pulverization process was carried out for 2 hours at a temperature in the mill not exceeding 50° C. After the completion of pulverization, the bead mill was disassembled and adhesion by the alloy within the mill was determined to be absent. After pulverization, 1600 g of an n-dodecane slurry of the aluminum-magnesium alloy was obtained from the 5-L SUS vessel. Approximately 0.2 g of the obtained n-dodecane slurry of the aluminum-magnesium alloy was sampled out and the median diameter was measured at 5.7 µm (Table 1-1).

Comparative Example 1-1

2-mm zirconia beads were filled to a fill ratio of 70% into a 1.4-L bead mill. 375 g (5.98 mol as aluminum, 8.80 mol as magnesium) of an aluminum-magnesium alloy (43 wt % aluminum, 57 wt % magnesium) and 1243 g n-dodecane were then introduced into a 5-L SUS vessel. While stirring the SUS vessel and maintaining uniformity, this slurry was transferred to the bead mill and pulverization was performed in the mill. The slurry that had passed through the mill was recirculated by return to the SUS vessel. This pulverization process was carried out at a temperature in the mill not exceeding 50° C. Clogging within the mill occurred when the pulverization process had been underway for 1 hour, and pulverization beyond this point was not possible and recovery of the alloy from within the mill was quite difficult. After pulverization, 775 g of an n-dodecane slurry of the aluminum-magnesium alloy was recovered from the 5-L SUS vessel. Approximately 0.2 g of the obtained n-dodecane slurry of the aluminum-magnesium alloy was sampled out and the median diameter was measured at 20 µm (Table 1-1).

Examples 1-4 to 1-9

The aluminum-magnesium alloy slurry obtained in Example 1-2 was filtered on a glass filter and the alloy was then washed with normal-hexane and dried. 9 g of the resulting dried alloy, 27 g n-dodecane, and 2.7 to 2.8 mol % of the organoaluminum compound shown in Table 1-2 were introduced into a separate 50-mL test tube for each example and the viscosity was measured using a rotational viscometer (the results of the viscosity measurement are shown in Table 1-2).

Example 1-10

753 g of the n-dodecane slurry obtained in Example 1-1 of aluminum-magnesium alloy having a median diameter of 9.7 µm (175 g as the aluminum-magnesium alloy, 578 g n-dodecane), 20.6 g iodine (0.0811 mol), and 5.31 g dimethylaluminum chloride (0.0574 mol) were introduced into a 3-L SUS pressure-resistant reaction vessel and stirring was performed for 1.5 hours at 40° C. Subsequent to this, a reaction was run by introducing methyl chloride while maintaining the temperature within the vessel at 125° C. The introduction of methyl chloride was halted once the pressure had risen to 0.4 MPa; the product gas was released from the reaction vessel; and the introduction of methyl chloride was then resumed. This process was performed four times, after which the temperature in the vessel was lowered to room temperature. A total of 442 g (8.76 mol: corresponded to 3.15 mol with reference to aluminum) of methyl chloride was introduced, and the required time was 4.5 hours. 400 rpm was used for the rotation rate of the stirring impeller. The pressure in the reaction vessel was then reduced to 5 kPa, and the temperature in the vessel was gradually raised to 110° C. and distillation was carried out. This distillation required 8 hours until the temperature in the vessel reached 110° C., and 500 rpm was used for the rotation rate of the stirring impeller. The distilled-out crude trimethylaluminum/n-dodecane was 169 g, and this fraction was submitted to quantitative analysis of the alkylaluminum and chlorine fraction. The alkylaluminum in the fraction was 1.70 mol as the total excluding the dimethylaluminum chloride initially used, and was 61.1% (crude yield) with reference to the aluminum fraction in the aluminum-magnesium alloy. The chlorine fraction was 0.274 mol including the dimethylaluminum chloride initially used.

In order to remove this chlorine fraction, 74.6 g (17.3 g as the aluminum-magnesium alloy) of the n-dodecane slurry of the aluminum-magnesium alloy described in Example 1-2 was added and stirring was carried out for 36 hours at 120° C.

A residual chlorine fraction could not be observed when the solution was subsequently submitted to analysis. This solution was distilled to obtain 113 g of trimethylaluminum. The yield was 56.2% with reference to the aluminum fraction in the aluminum-magnesium alloy.

Comparative Example 1-2

753 g of an n-dodecane slurry of aluminum-magnesium alloy having a median diameter of 110 µm (175 g as the aluminum-magnesium alloy, 578 g n-dodecane), 20.6 g iodine (0.0811 mol), and 5.31 g dimethylaluminum chloride (0.0574 mol) were introduced into a 3-L SUS pressure-resistant reaction vessel and stirring was performed for 1.5 hours at 40° C. Subsequent to this, a reaction was run by introducing methyl chloride while maintaining the temperature within the vessel at 125° C. The introduction of methyl chloride was halted once the pressure had risen to 0.4 MPa; the product gas was released from the reaction vessel; and the introduction of methyl chloride was then resumed. This process was performed four times, after which the temperature in the vessel was lowered to room temperature. A total of 119 g (2.37 mol: corresponded to 3.15 mol with reference to aluminum) of methyl chloride was introduced, and the required time was 4.5 hours. 400 rpm was used for the rotation rate of the stirring impeller. The pressure in the reaction vessel was then reduced to 5 kPa, and the temperature in the vessel was gradually raised to 1100° C. and distillation was carried out. This distillation required 8 hours until the temperature in the vessel reached 110° C., and 500 rpm was used for the rotation rate of the stirring impeller. The distilled-out crude trimethylaluminum/n-dodecane was 169 g, and this fraction was submitted to quantitative analysis of the alkylaluminum and chlorine fraction. The alkylaluminum in the fraction was 0.751 mol as the total excluding the dimethylaluminum chloride initially used, and was 26.9% (crude yield) with reference to the aluminum fraction in the aluminum-magnesium alloy. The chlorine fraction was 0.158 mol including the initially used dimethylaluminum chloride.

TABLE 1-1

| | Organic alkylaluminum | Aluminum-magnesium alloy slurry concentration (wt %) | Organic alkylaluminum concentration (mol %) | Median diameter of alloy after pulverization (μm) | Adhesion within the bead mill |
|---|---|---|---|---|---|
| Example 1-1 | Me$_2$AlCl | 20 | 2.7 | 12.6 | none |
| Example 1-2 | Me$_2$AlCl | 23 | 2.7 | 9.7 | none |
| Example 1-3 | Me$_2$AlCl | 30 | 2.7 | 5.7 | none |
| Comparative Example 1-1 | none | 23 | 0 | uncertain* 20 | yes |

*A large portion of the pulverized alloy was adhered within the mill. The median diameter of the pulverized alloy in the mill varied depending on the sampling location. The median diameter given for Comparative Example 1-1 is the value measured on the pulverized alloy that remained in the 5-L SUS vessel after pulverization. Me represents the methyl group.

TABLE 1-2

| | Median diameter of the aluminum-magnesium alloy (μm) | Organoaluminum compound | Concentration of organoaluminum compound (mol %) | Viscosity (cP) |
|---|---|---|---|---|
| Example 1-4 | 9.7 | Me$_3$Al | 2.7 | 7.0 |
| Example 1-5 | 9.7 | Et$_3$Al | 2.8 | 7.2 |
| Example 1-6 | 9.7 | Me$_2$AlCl | 2.7 | 11.6 |
| Example 1-7 | 9.7 | Et$_2$AlCl | 2.8 | 13.7 |
| Example 1-8 | 9.7 | PhAlMe$_2$ | 2.8 | 7.9 |
| Example 1-9 | 9.7 | * Me$_3$Al/(Me$_4$Al)$_2$Mg | 2.8 | 7.0 |

* Me$_3$Al/(Me$_4$Al)$_2$Mg = mixture at an 8.7/1 molar ratio.
Et represents the ethyl group. Ph represents the phenyl group.

Example 2: Example Corresponding to Second Aspect of Invention

The median diameter of the aluminum-magnesium alloy was measured using a Mastersizer 2000 laser diffraction particle size distribution analyzer from Malvern. The specific measurement conditions were the same as in Example 1. An X'Pert Pro x-ray diffraction instrument from PANalytical was used to determine the presence/absence of diffraction peaks originating with the crystalline structure of the aluminum-magnesium alloy. The results of measurement of the aluminum concentration were used for calculation of the yield of the trialkylaluminum. The aluminum concentration was basically determined by hydrolysis with 0.5 N aqueous sulfuric acid to yield a solution; addition of excess disodium ethylenediaminetetraacetate to this solution; and then back titration with zinc sulfate using dithizone as the indicator. Measurement of the chlorine fraction was performed basically by titration with silver nitrate of the solution provided by hydrolysis with 0.5 N aqueous sulfuric acid. Quantitative analysis of the trialkylaluminum and by-produced dialkylaluminum chloride was performed by analysis of the aluminum and analysis of the chlorine.

Example 2-1

Step (1)

The aluminum-magnesium alloy used in this example was Al-Mg 60 from Kanto Metal Corporation, which had a composition of 43 wt % aluminum and 57 wt % magnesium and had a median diameter of 110 μm. The results of x-ray diffraction measurements on this aluminum-magnesium alloy demonstrated that it was an aluminum-magnesium alloy having diffraction peaks originating in a crystalline structure. An aluminum-magnesium alloy having a median diameter of 8 μm was then obtained using a wet bead mill apparatus. The following were introduced into a 1-L autoclave that had been substituted with nitrogen: 90.0 g (1.431 mol as aluminum, 2.102 mol as magnesium) of the pulverization-processed aluminum-magnesium alloy, 285 g normal-dodecane (1.673 mol), and 4.0 g pyridine (0.035 mol per 1 mol of aluminum in the aluminum-magnesium alloy) as a nitrogen-containing organic compound.

After this, stirring at 600 rpm was carried out and the temperature was raised to 120° C. and a reaction was run by introducing 228.3 g methyl chloride (3.2 mol per 1 mol aluminum in the aluminum-magnesium alloy). Completion of the reaction was confirmed and the introduction of methyl chloride was finished. The methyl chloride introduction time was 5 hours.

After completion of the reaction, distillation was performed and a distillate containing trimethylaluminum and by-produced dimethylaluminum chloride was obtained and quantitative analysis was carried out on the aluminum content and the chlorine content. The amount of trimethylaluminum and the amount of dimethylaluminum chloride in the obtained solution were, respectively, 28.9 g (0.402 mol) trimethylaluminum and 5.1 g (0.055 mol) dimethylaluminum chloride, and the conversion on the basis of the aluminum in the introduced aluminum-magnesium alloy was 32%. The selectivity for trimethylaluminum was 88%, and the selectivity for dimethylaluminum chloride was 12%. The conversion for trimethylaluminum (conversion on the basis of aluminum×trimethylaluminum selectivity) was 28%.

Step (2)

Then, in order to reduce the obtained dimethylaluminum chloride, 7.00 g of the aluminum-magnesium alloy (0.5 mol as aluminum in the aluminum-magnesium alloy per 1 mol of the dimethylaluminum chloride) was added to the distillate containing trimethylaluminum and by-produced dimethylaluminum chloride and stirring was performed for 24 hours at 130° C. A chlorine fraction was not detected according to the results of analysis of the chlorine content in the solution post-reaction, and the elimination of the dimethylaluminum chloride was thus confirmed. The selectivity for trimethylaluminum was at least 99.99%.

30.5 g (0.42 mol) trimethylaluminum was then obtained by distillation. The yield was 30% with respect to the aluminum in the aluminum-magnesium alloy that was initially introduced (Table 2-1).

Example 2-2

Example 2-1 was carried out with the following exceptions: in the step (1), a supplemental addition of 20.0 g iodine (0.158 mol) was made and the amount of methyl chloride introduction was changed as shown in Table 2-1. The results are given in Table 2-1.

Example 2-3

Example 2-1 was carried out with the following exceptions: a supplemental addition of 2.5 g (0.027 mol) dimethylaluminum chloride was made and the amount of methyl chloride addition was changed as shown in Table 2-1. The results are given in Table 2-1. The amount of trimethylaluminum and amount of dimethylaluminum chloride obtained in the step (1) (excluding the dimethylaluminum chloride used) was, respectively, 31.9 g (0.443 mol) trimethylaluminum and 0.8 g (0.009 mol) dimethylaluminum chloride, and the conversion on the basis of the aluminum in the introduced aluminum-magnesium alloy was 32%. The conversion for trimethylaluminum (conversion on the basis of aluminum×trimethylaluminum selectivity) was 31%.

Example 2-4

Step (1)

The following were introduced into a 1-L autoclave that had been substituted with nitrogen and were stirred at 600 rpm for 1.5 hours at 40° C.: a slurry of 90.0 g of pulverization-processed aluminum-magnesium alloy (1.431 mol as aluminum, 2.102 mol as magnesium) and 285 g normal-dodecane (1.673 mol) slurry, 2.5 g dimethylaluminum chloride (0.027 mol), 20.0 g iodine (0.158 mol), and 4.0 pyridine as a nitrogen-containing organic compound (0.035 mol per 1 mol of the aluminum in the aluminum-magnesium alloy). The procedure was otherwise the same as in Example 2-1.

The amount of methyl chloride introduction was 214 g (3.0 mol per 1 mol aluminum in the aluminum-magnesium alloy). After completion of the reaction, distillation was performed and a distillate containing trimethylaluminum and by-produced dimethylaluminum chloride was obtained and quantitative analysis was carried out on the aluminum content and the chlorine content. The amount of trimethylaluminum and the amount of dimethylaluminum chloride (excluding the dimethylaluminum chloride used) in the obtained solution were, respectively, 66.2 g (0.918 mol) trimethylaluminum and 14.3 g (0.155 mol) dimethylaluminum chloride, and the conversion on the basis of the aluminum in the introduced aluminum-magnesium alloy was 75%. The conversion for trimethylaluminum (conversion on the basis of aluminum×trimethylaluminum selectivity) was 65%.

Step (2)

The reduction reaction was then carried out, and the chlorine content in the solution after the reduction reaction was analyzed with the following results: a chlorine fraction was not detected and the elimination of the dimethylaluminum chloride was thus confirmed. The selectivity for trimethylaluminum was at least 99.99%. 72.1 g (1.00 mol) of trimethylaluminum was then obtained by distillation. The yield was 70% with reference to the aluminum in the aluminum-magnesium alloy that was initially introduced (Table 2-1).

Examples 2-5 and 2-6

The procedure in Example 2-4 was carried out with the exception that the amount of addition of the pyridine, i.e., the nitrogen-containing organic compound, and the amount of introduction of the methyl chloride were changed as shown in Table 2-1. The results are given in Table 2-1.

Examples 2-7 to 2-17

The procedure in Example 2-4 was carried out with the exception that the type and amount of addition of the nitrogen-containing organic compound and the amount of introduction of the methyl chloride were changed as shown in Table 2-1. The results are given in Table 2-1.

Comparative Example 2-1

The procedure in Example 2-4 was carried out with the following exceptions: the nitrogen-containing organic compound, dimethylaluminum chloride, and iodine were not added and the amount of introduction of the methyl chloride was changed as shown in Table 2-1. The results are given in Table 2-1.

Comparative Example 2-2

The procedure in Example 2-4 was carried out with the following exceptions: the nitrogen-containing organic compound and iodine were not added and the amount of introduction of the methyl chloride was changed as shown in Table 2-1. The results are given in Table 2-1.

Comparative Example 2-3

The procedure in Example 2-4 was carried out with the following exceptions: the nitrogen-containing organic compound was not added and the amount of introduction of the methyl chloride was changed as shown in Table 2-1. The results are given in Table 2-1.

Comparative Example 2-4

The procedure in Example 2-4 was carried out with the following exceptions: the nitrogen-containing organic compound and dimethylaluminum chloride were not added and the amount of introduction of the methyl chloride was changed as shown in Table 2-1. The results are given in Table 2-1.

TABLE 2-1

| | Nitrogen-containing organic compound | | |
|---|---|---|---|
| | | Amount of introduction | |
| | Compound | [g] | Molar ratio[3] |
| Example 2-1 | Pyridine | 4 | 0.035 |
| Example 2-2 | Pyridine | 4 | 0.035 |
| Example 2-3 | Pyridine | 4 | 0.035 |
| Example 2-4 | Pyridine | 4 | 0.035 |
| Example 2-5 | Pyridine | 1.3 | 0.011 |
| Example 2-6 | Pyridine | 7.1 | 0.06 |
| Example 2-7 | Isoquinoline | 6.9 | 0.035 |
| Example 2-8 | Pyrimidine | 4.1 | 0.035 |
| Example 2-9 | 1-Methylimidazole | 4.1 | 0.035 |
| Example 2-10 | Triethylamine | 5 | 0.035 |
| Example 2-11 | N-Methylpyrrolidone | 5 | 0.035 |
| Example 2-12 | N,N-Dimethylacetamide | 4.4 | 0.035 |
| Example 2-13 | 1,1'-Azobis(N,N-dimethylformamide) | 8.6 | 0.035 |
| Example 2-14 | Diethylamine | 3.7 | 0.035 |
| Example 2-15 | Pyrrolidine | 3.6 | 0.035 |
| Example 2-16 | Diisopropylamine | 5.1 | 0.035 |
| Example 2-17 | Pyridine + Isoquinoline | 2.3 + 3.7 | 0.02 + 0.02 |
| Comparative Example 2-1 | none | — | — |
| Comparative Example 2-2 | none | — | — |
| Comparative Example 2-3 | none | — | — |
| Comparative Example 2-4 | none | — | — |

| | Reaction step | | | | | |
|---|---|---|---|---|---|---|
| | DMAC | | Iodine | | Methyl chloride | |
| | [g] | Molar ratio[3] | [g] | Molar ratio[3] | [g] | Molar ratio[3] |
| Example 2-1 | — | — | — | — | 228 | 3.2 |
| Example 2-2 | — | — | 20 | 0.158 | 207 | 2.9 |
| Example 2-3 | 2.5 | 0.027 | — | — | 171 | 2.4 |
| Example 2-4 | 2.5 | 0.027 | 20 | 0.158 | 214 | 3 |
| Example 2-5 | 2.5 | 0.027 | 20 | 0.158 | 213 | 3 |
| Example 2-6 | 2.5 | 0.027 | 20 | 0.158 | 233 | 3.2 |
| Example 2-7 | 2.5 | 0.027 | 20 | 0.158 | 239 | 3.3 |
| Example 2-8 | 2.5 | 0.027 | 20 | 0.158 | 235 | 3.3 |
| Example 2-9 | 2.5 | 0.027 | 20 | 0.158 | 233 | 3.2 |
| Example 2-10 | 2.5 | 0.027 | 20 | 0.158 | 217 | 3 |
| Example 2-11 | 2.5 | 0.027 | 20 | 0.158 | 250 | 3.5 |
| Example 2-12 | 2.5 | 0.027 | 20 | 0.158 | 191 | 2.7 |
| Example 2-13 | 2.5 | 0.027 | 20 | 0.158 | 181 | 2.5 |
| Example 2-14 | 2.5 | 0.027 | 20 | 0.158 | 194 | 2.7 |
| Example 2-15 | 2.5 | 0.027 | 20 | 0.158 | 241 | 3.4 |
| Example 2-16 | 2.5 | 0.027 | 20 | 0.158 | 194 | 2.7 |
| Example 2-17 | 2.5 | 0.027 | 20 | 0.158 | 223 | 3.1 |
| Comparative Example 2-1 | — | — | — | — | 224 | 3.1 |
| Comparative Example 2-2 | 2.5 | 0.027 | — | — | 193 | 2.7 |
| Comparative Example 2-3 | 2.5 | 0.027 | 20 | 0.158 | 253 | 3.5 |
| Comparative Example 2-4 | — | — | 20 | 0.158 | 224 | 3.1 |

| | Reaction step | | | | Reduction step | After distillation |
|---|---|---|---|---|---|---|
| | Conversion [%] | TMAL[1] selectivity [%] | DMAC[2] selectivity [%] | TMAL[4] conversion [%] | TMAL[1] selectivity [%] | Yield [%] |
| Example 2-1 | 32 | 88 | 12 | 28 | >99.99 | 30 |
| Example 2-2 | 59 | 93 | 7 | 55 | >99.99 | 55 |
| Example 2-3 | 32 | 98 | 2 | 31 | >99.99 | 29 |
| Example 2-4 | 75 | 86 | 14 | 65 | >99.99 | 70 |
| Example 2-5 | 71 | 87 | 13 | 62 | >99.99 | 66 |
| Example 2-6 | 70 | 87 | 13 | 61 | >99.99 | 65 |

TABLE 2-1-continued

| | | | | | | |
|---|---|---|---|---|---|---|
| Example 2-7 | 71 | 89 | 11 | 63 | >99.99 | 66 |
| Example 2-8 | 61 | 87 | 13 | 53 | >99.99 | 57 |
| Example 2-9 | 68 | 87 | 13 | 59 | >99.99 | 63 |
| Example 2-10 | 66 | 89 | 11 | 59 | >99.99 | 61 |
| Example 2-11 | 61 | 90 | 10 | 55 | >99.99 | 57 |
| Example 2-12 | 63 | 91 | 9 | 57 | >99.99 | 58 |
| Example 2-13 | 65 | 88 | 12 | 57 | >99.99 | 60 |
| Example 2-14 | 57 | 65 | 35 | 37 | >99.99 | 53 |
| Example 2-15 | 55 | 75 | 25 | 41 | >99.99 | 52 |
| Example 2-16 | 52 | 75 | 25 | 39 | >99.99 | 48 |
| Example 2-17 | 71 | 89 | 11 | 63 | >99.99 | 66 |
| Comparative Example 2-1 | 28 | 66 | 34 | 18 | >99.99 | 26 |
| Comparative Example 2-2 | 24 | 87 | 13 | 21 | >99.99 | 23 |
| Comparative Example 2-3 | 42 | 75 | 25 | 32 | >99.99 | 39 |
| Comparative Example 2-4 | 50 | 90 | 10 | 45 | >99.99 | 46 |

[1]TMAL: trimethylaluminum
[2]DMAC: dimethylaluminum chloride
[3]The molar ratio is given with reference to 1 mol of the aluminum in the aluminum-magnesium alloy.
[4]TMAL conversion: conversion × TMAL selectivity

INDUSTRIAL APPLICABILITY

As has been made clear by the examples given above, in accordance with the first embodiment of the present invention, a very active aluminum alloy can be obtained via an easy industrial operability using starting materials that are easily acquirable at an industrial level, thus providing a very high industrial value.

Common, generally readily acquirable aluminum-magnesium alloys can be used in accordance with the second embodiment of the present invention, and the second embodiment of the present invention also makes possible the production of trialkylaluminum without having to use a special production procedure such as the use of an abrasive medium during the reaction.

The invention claimed is:

1. A method for producing trialkylaluminum, comprising a step (1) of obtaining a trialkylaluminum-containing reaction product by reacting an aluminum-magnesium alloy with an alkyl halide in the presence of a nitrogen-containing organic compound.

2. The production method according to claim 1, wherein the reaction product from the step (1) contains a dialkylaluminum halide and the production method further contains a step (2) of converting the dialkylaluminum halide to a trialkylaluminum by feeding this reaction product to a reductive dechlorination reaction.

3. The production method according to claim 1, wherein at least one additive selected from the group consisting of alkylaluminum compounds, iodine, bromine, and halogen compounds is co-present in the step (1).

4. The production method according to claim 3, wherein the amount of additive addition is in the range equal to or more than 0.01 mol to equal to or less than 0.3 mol per 1 mol of the aluminum in the aluminum-magnesium alloy.

5. The production method according to claim 3, wherein the alkylaluminum compound is a dialkylaluminum halide.

6. The production method according to claim 1, wherein the nitrogen-containing organic compound is one or two or more compounds selected from the group consisting of amine compounds, nitrogen atom-containing heterocyclic compounds, and amide compounds.

7. The production method according to claim 6, wherein the amine compound is a secondary amine compound or a tertiary amine compound.

8. The production method according to claim 6, wherein the nitrogen atom-containing heterocyclic compound is an unsaturated heterocyclic compound.

9. The production method according to claim 1, wherein the amount of the nitrogen-containing organic compound is in the range equal to or more than 0.001 mol to equal to or less than 0.2 mol per 1 mol of the aluminum in the aluminum-magnesium alloy.

10. The production method according to claim 1, wherein the alkyl halide is a methyl halide.

11. The production method according to claim 1, wherein the alkyl halide is methyl chloride and the trialkylaluminum is trimethylaluminum.

* * * * *